Sept. 20, 1966 P. E. BADDORF ET AL 3,273,971
APPARATUS FOR IMPROVING THE PURIFICATION OF EXHAUST GASES
FROM AN INTERNAL COMBUSTION ENGINE
Filed Sept. 26, 1963
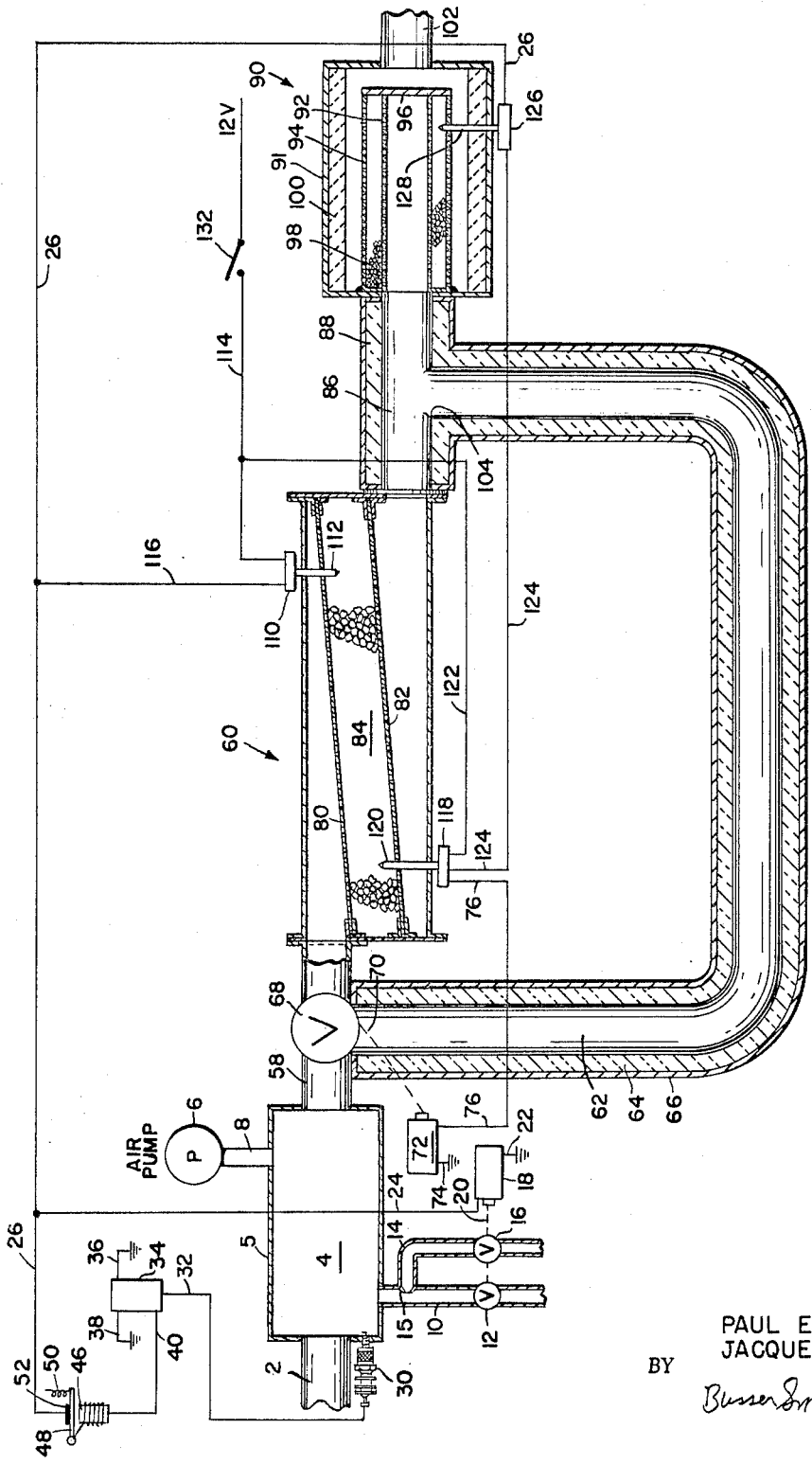
INVENTORS
PAUL E. BADDORF &
JACQUES H. HOUDRY
BY
ATTORNEYS

United States Patent Office 3,273,971
Patented Sept. 20, 1966

3,273,971
APPARATUS FOR IMPROVING THE PURIFICATION OF EXHAUST GASES FROM AN INTERNAL COMBUSTION ENGINE
Paul E. Baddorf, Chester Springs, and Jacques H. Houdry, Villanova, Pa., assignors to Oxy-Catalyst, Inc., Berwyn, Pa., a corporation of Pennsylvania
Filed Sept. 26, 1963, Ser. No. 312,256
2 Claims. (Cl. 23—288)

This invention relates to an improvement in apparatus for the purification of exhaust gases from an internal combustion engine and more particularly relates to such an improvement employed with a catalytic exhaust purifier generally in an automobile.

It is well known to employ an exhaust purifier containing an oxidation catalyst to purify exhaust gases from internal combustion engines operating on gasoline, generally leaded gasoline, to oxidize the oxidizable constituents of the exhaust gases and thus purify such gases.

The operating temperature of the catalyst is normally in the range of from about 800° F. to about 1400° F. While the catalyst will initially be heated by the sensible heat in the exhaust gases, it is desirable to add additional heat by the employment of a burner upstream of the catalyst. Such a burner is also useful for bringing catalyst back into its operating range when it has dropped below this range due to adverse conditions such as driving through heavy water or slush or when the operating condition of the engine, such as for example, idling, is unfavorable for the maintenance of the operating temperature of the catalyst.

In addition, it has been found necessary to protect the catalyst from undesirably high temperatures, for example 1750° F. to 2000° F. at which temperature catalytic activity is destroyed and warping of the purifier structure occurs. Such undesirably high temperatures tend to occur when the automobile is driven at a relatively high speed or when the power jets of the carburetor cut in, at which time the exhaust gas temperature becomes relatively high and the oxidizable constituents of the exhaust gas also become relatively high. One solution to the problem of excessive catalyst temperatures has been to by-pass the catalyst when it reaches a predetermined maximum temperature. The by-passing, of course, results in the discharge to the atmosphere of unpurified exhaust gas.

In accordance with this invention, an exhaust gas purifier is provided which meets all the requirements of rapid start-up and protection of the catalyst against elevated temperatures by by-passing with means to eliminate a substantial portion of the undesired hydrocarbons and carbon monoxide by-passed.

The invention and its object will be further clarified on reading the following description in conjunction with the drawing which is a diagrammatic representation of an exhaust purifier in accordance with the invention.

As shown in the drawing, an exhaust pipe 2 leading from the exhaust manifold of a gasoline internal combustion automobile engine discharges into combustion chamber 4 formed by a casing 5 which is cylindrical in cross-section. An air pump 6 driven, for example by an electric motor or by the automobile engine discharges into a pipe 8 which in turn discharges into the interior of combustion chamber 4 to provide adequate air for the oxidation of the oxidizable constituents of the exhaust gases in the catalytic exhaust purifier to be described later.

An air supply line 10 connected to a source of air under pressure (not shown) is provided with a control valve 12 and discharges into combustion chamber 4. A gasoline line 14 discharges into line 10 through a nozzle end 15 to add fuel to the air in line 10 and thus provide for the introduction of an air-fuel mixture into combustion chamber 4. Line 14 is provided with a control valve 16. A solenoid 18 is operatively connected to valves 12 and 16 as indicated by the construction line 20. Solenoid 18 is connected to ground by line 22 and is connected to a line 24 which in turn is connected to a line 26.

For the ignition of the air-fuel mixture introduced into combustion chamber 4, there is provided a spark plug 30 which is connected by line 32 to the secondary winding (not shown) of coil 34 which is also connected to ground by line 36. The primary winding of coil 34 is connected to ground by line 38 and to line 40 part of which is wound about a magnetizable core 46 and then connected to magnetizable pivoted switch arm 48. Switch arm 48 is biased upwardly by an extension coil spring 50 against contact 52 which is connected to line 26.

Combustion chamber 4 discharges into an exhaust pipe section 58 which in turn is connected to an exhaust purifier 60. A by-pass line 62 is connected to exhaust pipe section 58 upstream of exhaust purifier 60 and is surrounded by insulating material 64 which is protected by a metal sheath 66.

A two-position valve 68 controls exhaust pipe section 58 and by-pass line 62 so as to normally block line 62 and permit the flow of gases through section 58 into exhaust purifier 60. A solenoid 72 is operatively connected to valve 68 as indicated by the construction line 70 and can shift valve 68 so as to block the flow of gases into exhaust purifier 60 and cause them to flow through by-pass line 62. Solenoid 72 is connected to ground by a line indicated at 74 and is connected to a line 76.

Exhaust purifier 60 provided with opposed sloping grids 80 and 82 between which is contained a bed of catalyst 84. Exhaust purifier 60 discharges into a discharge line 86 which is insulated as indicated at 88, and discharges into a reaction chamber 90 formed by a casing 91 which is cylindrical in vertical cross-section. Reaction chamber 90 contains a cylindrical grid 92 which is of the same diameter as and concentric with exhaust pipe section 86. Surrounding and spaced from screen 92 is a larger diameter grid 94. Both grids 92 and 94 extend from the entrance end of reaction chamber 90 to a solid end plate 96. Pieces of refractory material 98 are contained between grids 92 and 94. Any porous refractory material will be satisfactory, such as for example, foundry slag, silica, silicon carbides, kaolin clays, α phase alumina, alumina-diaspore, diaspore, mullite, fire clay, carbon ceramic chrome magnesite, dead burned magnesite and fire clay plastic. Chamber 90 is lined with a solid tube of refractory material 100 which may be made, for example, from any of the previously recited refractory materials. Reaction chamber 90 discharges into a line 102 leading to the atmosphere.

By-pass line 62 is connected to exhaust pipe section 86 as indicated at 104 upstream of reaction chamber 90 and downstream of exhaust purifier 60.

Control of the apparatus is achieved by the employment of three thermo switches. A thermo switch 110 has a sensing element 112 which extends into catalyst bed 84 and is connected to a power supply line 114 and is connected to line 26 by line 116. A thermo switch 118 has a sensing element 120 which also extends into catalyst bed 84 and is connected to a line 122 which in turn is connected to power line 114. Switch 118 is also connected to line 76 and to a line 124. A thermo switch 126 has a sensing element 128 which extends into the pieces of refractory material 98 and is connected to lines 26 and 124.

Thermo switch 110 is normally closed and opens when the catalyst reaches a predetermined minimum temperature in its operating range. Thermo switch 118 is normally open and is set to close when the catalyst temperature reaches a predetermined maximum safe temperature. Thermo switch 126 is normally open and closes when the pieces of refractory material 98 reach a predetermined minimum temperature.

Operation

In operation, pump 6 will be operating continuously to provide an amount of air somewhat in excess of the stoichiometric amount required for the oxidation of the oxidizable constituents of the exhaust gases in the exhaust purifier 60. When a cold start is made, switch 132, which may conveniently be the ignition switch, will be closed to energize line 114 which in turn due to the fact that thermo switch 110 will be closed will energize solenoid 18 opening valves 12 and 16 to supply air through line 10 and fuel through line 14 to introduce an air-fuel mixture into combustion chamber 4. At the same time, spark plug 30 will repeatedly produce a spark to ignite the air-fuel mixture. The hot gases resulting from the combustion of the air-fuel mixture together with the hot exhaust gases will flow through exhaust pipe section 58 and through the bed of catalyst 84 in exhaust purifier 60 resulting in the rapid heating of the catalyst to its minimum operating temperature, at which temperature thermo switch 110 will open causing the deenergizing of solenoid 18 and the consequent closing of valves 12 and 16 to stop the flow of the air-fuel mixture into combustion chamber 4. At the same time, spark plug 30 will be deactivated. It will be appreciated, of course, that satisfactory operation will be achieved if spark plug 30 is not deactivated at this stage but continues to produce a spark. Should the catalyst temperature drop below the desired minimum operating temperature, thermo switch 110 will again close with the above discussed operation being repeated. Switch 118 being open, no current can flow through line 76 to solenoid 72.

With the catalyst in its desired operating range, the exhaust gases will continue to pass through the catalyst bed where the oxidizable constituents will be substantially oxidized and discharged through discharge line 86 into reaction chamber 90. As the gases pass through the bed of refractory pieces 98, the refractory pieces will be heated to an elevated temperature as will also the tube of refractory material 100. The gases are conducted to the atmosphere from the combustion chamber 90 by line 102.

Should the catalyst become heated to a predetermined maximum safe temperature, thermo switch 118 will close to energize line 124 and line 76, the latter energizing solenoid 72 which will shift valve 68 to block the flow of gases into exhaust purifier 60 and cause the gases to flow through by-pass line 62 and then into discharge line 86 and into reaction chamber 90. The preheated refractory material with its large surface area and mass promotes oxidation of the by-pass exhaust gases. While this oxidation will be substantially less efficient than the oxidation by the exhaust purifier, it will be substantially beneficial.

If the temperature of the pieces of refractory material 98 drop below the acceptable minimum for satisfactory oxidation in reaction chamber 90, for example, below a temperature in the range of 1400–1500° F., thermo switch 126 will close causing line 26 to be energized which will result in the introduction of the air-fuel mixture into combustion chamber 4 and its ignition by sparking of spark plug 30 as previously described. The heat generated by the combustion of the air-fuel mixture in combustion chamber 4 will promote the thermal oxidation of the exhaust gases.

When the catalyst in exhaust purifier 60 falls down to within its desired operating temperature range, thermo switch 118 will open deenergizing solenoid 72 and causing the shifting of valve 68 so as to block by-pass line 62 and cause the exhaust gases to flow into exhaust purifier 60 and simultaneously cause the deenergizing of line 124 and consequently stopping the combustion of an air-fuel mixture in combustion chamber 4.

From the above described operation, it will be clear that the invention with a minimum of apparatus and in particular with only a single burner provides for a maximum efficiency of operation under all possible conditions. Under favorable conditions, the combustion of an added air-fuel mixture is unnecessary. Further, under no condition, are the exhaust gases discharged to the atmosphere without very substantial oxidation.

It will be evident that the above described embodiment of the invention is illustrative only and is not intended to be limiting.

Catalytic exhaust purifiers are, of course, well known to the art. The catalyst pellets employed to form the catalyst bed may be by way of example a pellet of an activated metal oxide, preferably activated alumina, beryllia, thoria, magnesia or zirconia impregnated with metal or metal oxides having oxidation activity, such as platinum, palladium, ruthenium, rhodium, copper, silver, chromium, vanadium or mixtures thereof.

What is claimed is:

1. In combination with an engine having an exhaust system provided with an exhaust pipe for conveying exhaust gases from the engine, air supply means and an exhaust purifier having an inlet in communication with the exhaust pipe and an outlet and containing an oxidation catalyst for the oxidation of the oxidizable constituents of the exhaust gases, the improvement comprising:
    means forming a combustion chamber upstream of the exhaust purifier,
    means to introduce an air-fuel mixture into the combustion chamber,
    igniting means in said combustion chamber to ignite the air-fuel mixture,
    a by-pass conduit having its inlet end connected to the exhaust pipe upstream of the exhaust purifier and downstream of the air supply means and of the combustion chamber,
    valve means controlling the exhaust pipe and by-pass line and normally closing off the by-pass line and directing the flow of exhaust gases to the exhaust purifier,
    means forming a reaction chamber in communication with said by-pass line and with the outlet of the exhaust purifier,
    ceramic material in said reaction chamber for contact by gases passing through the reaction chamber,
    means responsive to a predetermined minimum temperature of the oxidation catalyst to stop the introduction of the air-fuel mixture into the combustion chamber and deactivate the igniting means,
    means responsive to a predetermined maximum temperature of the oxidation catalyst to shift the valve means to a by-pass condition to stop the flow of gases to the exhaust purifier and cause the gases to flow through the by-pass conduit and the reaction chamber, and
    means responsive to a predetermined minimum temperature of the refractory material during the flow of gases through the by-pass conduit to cause the reintroduction of the air-fuel mixture into the combustion chamber and the reactivation of the igniting means.

2. In combination with an engine having an exhaust system provided with an exhaust pipe for conveying exhaust gases from the engine, air supply means and an exhaust purifier having an inlet in communication with the exhaust pipe and an outlet and containing an oxidation catalyst for the oxidation of the oxidizable constituents of the exhaust gases, the improvement comprising:
    means forming a combustion chamber upstream of the exhaust purifier;
    means to introduce an air-fuel mixture into the combustion chamber,